(12) United States Patent
Mullen et al.

(10) Patent No.: US 9,694,766 B2
(45) Date of Patent: Jul. 4, 2017

(54) COMPRESSION ALGORITHMS FOR VEHICLE-BUS-MESSAGING OF PREVIEW DATA

(71) Applicant: Ford Global Technologies, LLC, Dearborn, MI (US)

(72) Inventors: Jonathan Thomas Mullen, Palo Alto, CA (US); Anthony Mario D'Amato, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 14/740,949

(22) Filed: Jun. 16, 2015

(65) Prior Publication Data

US 2016/0368435 A1    Dec. 22, 2016

(51) Int. Cl.
*B60R 16/023* (2006.01)
*H04L 12/40* (2006.01)

(52) U.S. Cl.
CPC ............ *B60R 16/023* (2013.01); *H04L 12/40* (2013.01); *H04L 2012/40273* (2013.01)

(58) Field of Classification Search
CPC .................. B60R 16/023; H04L 12/40; H04L 2012/40273
See application file for complete search history.

(56) References Cited

U.S. PATENT DOCUMENTS

| | | | |
|---|---|---|---|
| 6,433,710 B1 | 8/2002 | Heavens | |
| 8,676,587 B1 * | 3/2014 | Gazdzinski | ........ G06Q 30/0251 342/357.22 |
| 2011/0264844 A1 | 10/2011 | Fischer | |
| 2013/0201316 A1 | 8/2013 | Binder | |
| 2014/0245102 A1 | 8/2014 | Hartwich | |

FOREIGN PATENT DOCUMENTS

| EP | 1632925 A1 | 12/2014 |
|---|---|---|
| KR | 20080030876 A | 4/2008 |

OTHER PUBLICATIONS

Ishizaka, H., Tanaka, K., Tanaka, M., and Tanaka, Y., "Development of Road's Gradient Anticipatory Algorithm for Hybrid Heavy Duty Truck," SAE Technical Paper 2014-01-2377.

* cited by examiner

*Primary Examiner* — Richard Camby
(74) *Attorney, Agent, or Firm* — David R. Stevens; Stevens Law Group

(57) ABSTRACT

Disclosures teach providing data over a vehicle bus, data providing values for a road attribute indexed to points anticipated to be traversed by a vehicle. To compress the data, a server may fit a regression function to the data with coefficients applied to kernels in the function. The server may limit the number of coefficients to reflect a limitation on rate of change imposed on data by the road on which it reports. Similarly, the server may limit one or more numbers of bits encoding the coefficients in a message transmitted on the vehicle bus, reflective of a limited range of potential amplitudes for data imposed by the road. A client may maintain a copy of the kernels and retrieve the coefficients from the message. The client may estimate future values of the road attribute by evaluating the coefficients applied to the kernels, which may, in some examples, be Gaussian.

20 Claims, 8 Drawing Sheets

$$S \triangleq \sum_{1}^{N} y[k](\Theta^T \varphi[k] - \delta[k])^2$$

$$L \leq \Theta \leq U$$

$$\varphi[k] \triangleq \begin{bmatrix} f_1(k) \\ f_2(k) \\ \vdots \\ f_n(k) \end{bmatrix}$$

COMPRESSION ALGORITHMS FOR VEHICLE-BUS-MESSAGING OF PREVIEW DATA

FIELD OF THE INVENTION

This invention relates to vehicles with electronic control systems and, more particularly, to the transmission of data to control systems over vehicle buses within such vehicles.

BACKGROUND OF THE INVENTION

A vehicle bus, such as a Controller Area Network (CAN) bus, provides a means of communication between various computing systems, aspects of one or more computing systems, sensor, actuators, and/or the like relied on by contemporary vehicles of various types. As the number of such elements in contemporary vehicles has proliferated over the years, establishing individual communication links between these elements has become costly, burdensome, and impractical. Large wiring harnesses and enormous lengths of wiring leading every which way throughout a vehicle are required. A bus-based approach, however, allows many elements to transmit and receive data over a single physical transmission medium, removing the cost and the cumbersome considerations involved in providing separate wiring between elements.

Nevertheless, as the number and uses of control-system elements have continued to proliferate, the demands on a given vehicle bus have also increased, making the capacity of a vehicle bus an issue of increasing significance. Although a stressed vehicle bus typically does not result in communication data between vehicle elements being dropped, insufficient capacity can often result in delayed delivery of the data, particularly for data not considered to have a high priority, such as the high priority associated with data used in control systems deemed to have implications for safety. Because of the time sensitive nature usually associated with the various types of data communicated on the vehicle bus, delay can result in significant problems and can even preclude certain applications.

BRIEF DESCRIPTION OF THE DRAWINGS

In order that the advantages of the disclosures will be readily understood, a more particular description will be rendered by reference to specific embodiments illustrated in the appended drawings. Understanding that these drawings depict only typical examples and are not, therefore, to be considered limiting in scope, the invention will be described and explained with additional specificity and detail through use of the accompanying drawings, in which.

DETAILED DESCRIPTION

It will be readily understood that the components of the present invention, as generally described and illustrated in the figures herein, can be arranged and designed in a wide variety of different configurations. Thus, the following more detailed description, as represented in the figures, is not intended to be limiting in scope, as claimed, but is merely representative of certain examples. The presently described examples will be best understood by reference to the drawings, wherein like parts are designated by like numerals throughout.

Figure 1:
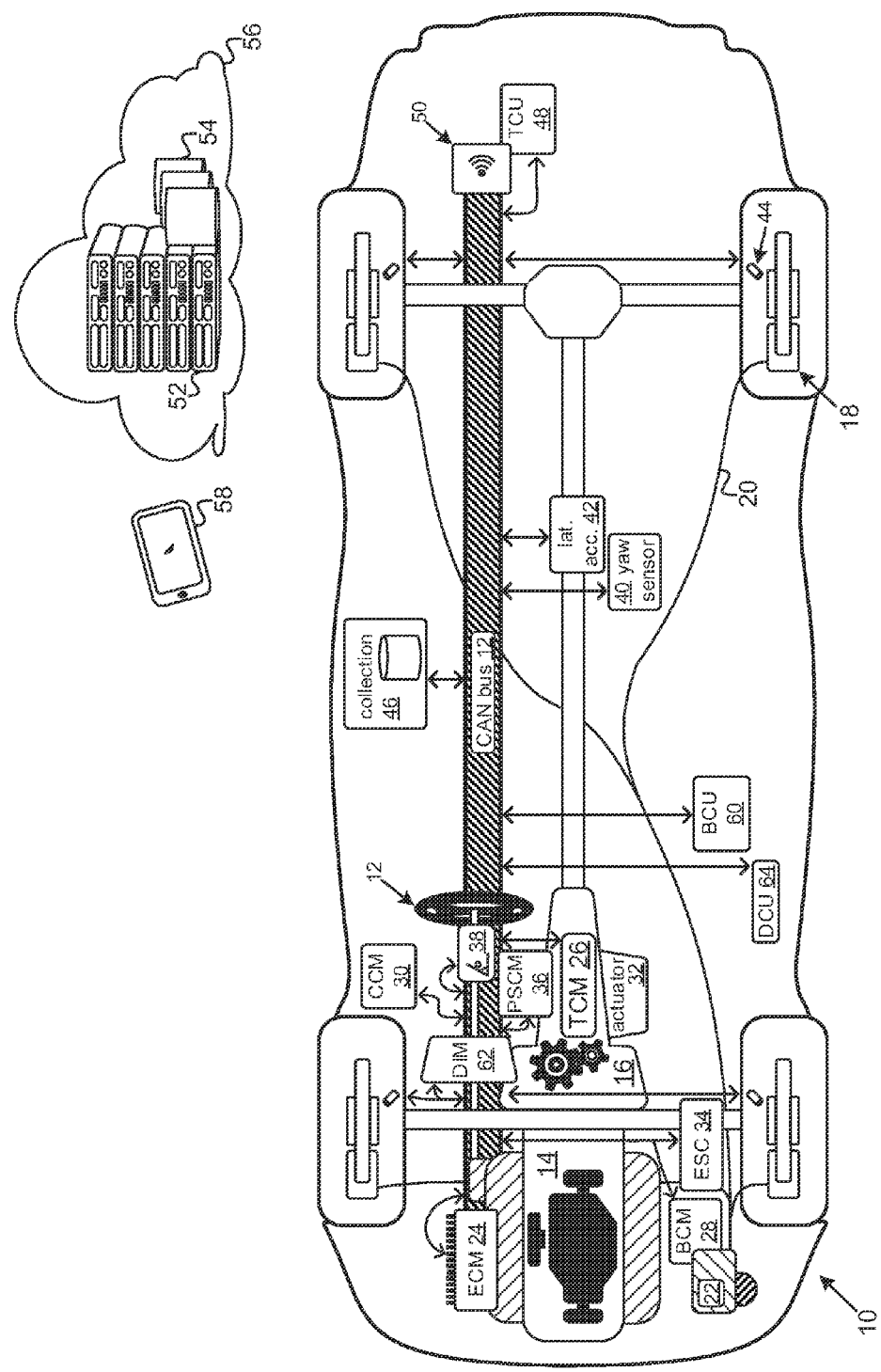
FIG. 1 is a schematic block diagram providing a bottom-view of a road vehicle having a vehicle bus, together with various Electronic Control Units (ECU), sensors, actuators, and data storage devices that may rely on the vehicle bus to communicate data used to enable various vehicle systems, in accordance with examples.

Referring to FIG. 1, the outline of a vehicle 10 is depicted. In the scenario depicted in FIG. 1, the vehicle 10 is a road vehicle, car, and/or automobile viewed from below. However, other types of vehicles are consistent with the teachings herein. The figure also displays a vehicle bus 12, which may implement any number protocols, such as: Controller Area Network (CAN) bus; Local Interconnect Network (LIN) bus; Byteflight; Domestic Digital Bus (D2B); FlexRay; Direct Current (DC)-bus; Intelligent Transport System Data Bus (IDB)-1394; Inter Equipment Bus (IEBus); Inter-Integrated Circuit (I$^2$C); International Organization for Standardization (ISO) 9141-1/-2; Society of Automotive Engineers (SAE) J1708; SAE J1587; SAE J1850; SAE J1939; ISO 11783; Keyword Protocol 2000 (KWP2000); Media Oriented Systems Transport (MOST); International Electrotechnical Commission (IEC) 61375; SMARTwireX; Serial Peripheral Interface (SPI); Vehicle Area Network (VAN); and/or the like.

The vehicle bus 12 may enable implementation of electrical control systems within the vehicle 10 by providing a means of communication between the multiple elements in the vehicle 10 involved in such electrical control systems. Examples of general categories of such elements may include sensors, actuators, interfaces, databases, and/or Electric Control Units (ECUs). As used herein, the term ECU is used to refer generally to any number of different embedded systems, microcontrollers, and/or computing systems that may control electrical systems within the vehicle 10, specific examples of which being discussed in greater detail below.

In addition to the vehicle bus 12, various elements of the powertrain of the vehicle are depicted. Such elements of the powertrain include an engine 14 and a transmission 16. Additionally, elements of the brake system are depicted. For example, four sets of disc brakes 18, are depicted, together with hydraulic lines 20 and a master cylinder 22. A subset of electronic control systems for the vehicle 10, which may take readings from and/or interact with the powertrain and/or brake system, may be characterized as a longitudinal control systems.

Various examples of ECUs that may pertain to longitudinal control systems and which may rely on the vehicle bus 12 to communicate with one another, receive data, and/or send commands to actuators. Such ECU's may include, by way of example and not limitation, an Electronic/Engine Control Module (ECM) 24, a Transmission Control Module (TCM) 26, a Powertrain Control Module (PCM)—which may combine an ECM 24 and a TCM 26, a Brake Control Module (BCM) 28, and/or a Cruise-Controller Module (CCM) 30. Such ECUs may acquire data over the vehicle bus 12 from a variety of sensors, databases, and/or interfaces. In some examples, some of such sensors, databases, and/or interfaces may be directly coupled to one or more ECUs, which may in turn relay data to one or more additional ECUs over the vehicle bus 12. Additionally, a variety of actuators, such as the depicted transmission actuator 32, providing a means to shift gears in response to an ECU determination, may receive commands over the vehicle bus 12, either directly or via a receiving ECU.

Such ECUs in longitudinal control systems could beneficially use data previewing future values for one or more road attributes of a road traveled by the vehicle 10 in many different ways. For example, and without limitation, ECUs in longitudinal control systems could use data reporting on the characteristics of the road, path, and/or trail ahead to optimize fuel consumption and/or improve ride smoothness, as discussed in further detail below. As another non-limiting example, a subset of electronic control systems for the vehicle 10, which may be categorized as lateral vehicle control systems, may also beneficially apply path-preview data.

ECUs depicted in FIG. 1 that may be involved in lateral vehicle control systems include an Electronic Stability Control (ESC) 34, alternatively referred to as an Electronic Stability Program (ESP) or Dynamic Stability Control (DSC). An additional non-limiting example may include a Power Steering Control Module (PSCM) 36 and the BCM 28. Non-limiting examples of sensors that may provide data to lateral control system's may include a steering angle sensor 38, a yaw sensor 40, a lateral acceleration sensor 42, and a set of brake sensors 44. The disc brakes 18 and/or master cylinder 22 may provide examples of actuators.

To provide potential benefits, ECUs in the longitudinal, lateral, and or other electronic control systems must first acquire the path-preview data. In some examples, the vehicle 10 may include an onboard-collection module 46. The onboard-collection module 46 may be operable to collect and store the path-preview data as the vehicle 10 travels, on a previous journey, the road being currently traveled.

In certain examples, the vehicle 10 may include a Telematic Control Unit (TCU) 48, or the like. The TCU 48 may include an external interface 50 for mobile communication. In such examples, the TCU 48 may use the external interface 50 for mobile communication to access one or more computing systems 52 that can access one or more databases 54 in a cloud environment 56 and/or over the internet. The database(s) 56 may maintain the path-preview data. In some examples, the external interface 50 may communicate with a mobile device 58, such as a mobile phone to access the internet/cloud computing environment 56. In such examples, a communication module, which may include the TCU 48 and/or external interface 50, may receive the preview data from the cloud computing environment 56, via an internet connection, and/or over the mobile device 58.

Apart from the longitudinal and lateral control systems, ECUs relevant to different types of electoral control systems may also be included in the vehicle 10. By way of providing some non-limiting examples, FIG. 1 also depicts a Body Control Unit (BCU) 60, a Driver Interface Module (DIM) 62, and a Door Control Unit (DCU) 64. Many other types of ECU's may also be included in the vehicle 10, together with other types of sensors, actuators, and/or other devices, may provide data for transmission over and/or rely on data received from the vehicle bus 12. Some implications for providing preview data to relevant ECU's, whether from the onboard-collection module 46, the TCU 48, and/or the like, over the vehicle bus 12 are discussed with respect to the following figure.

Figure 2:
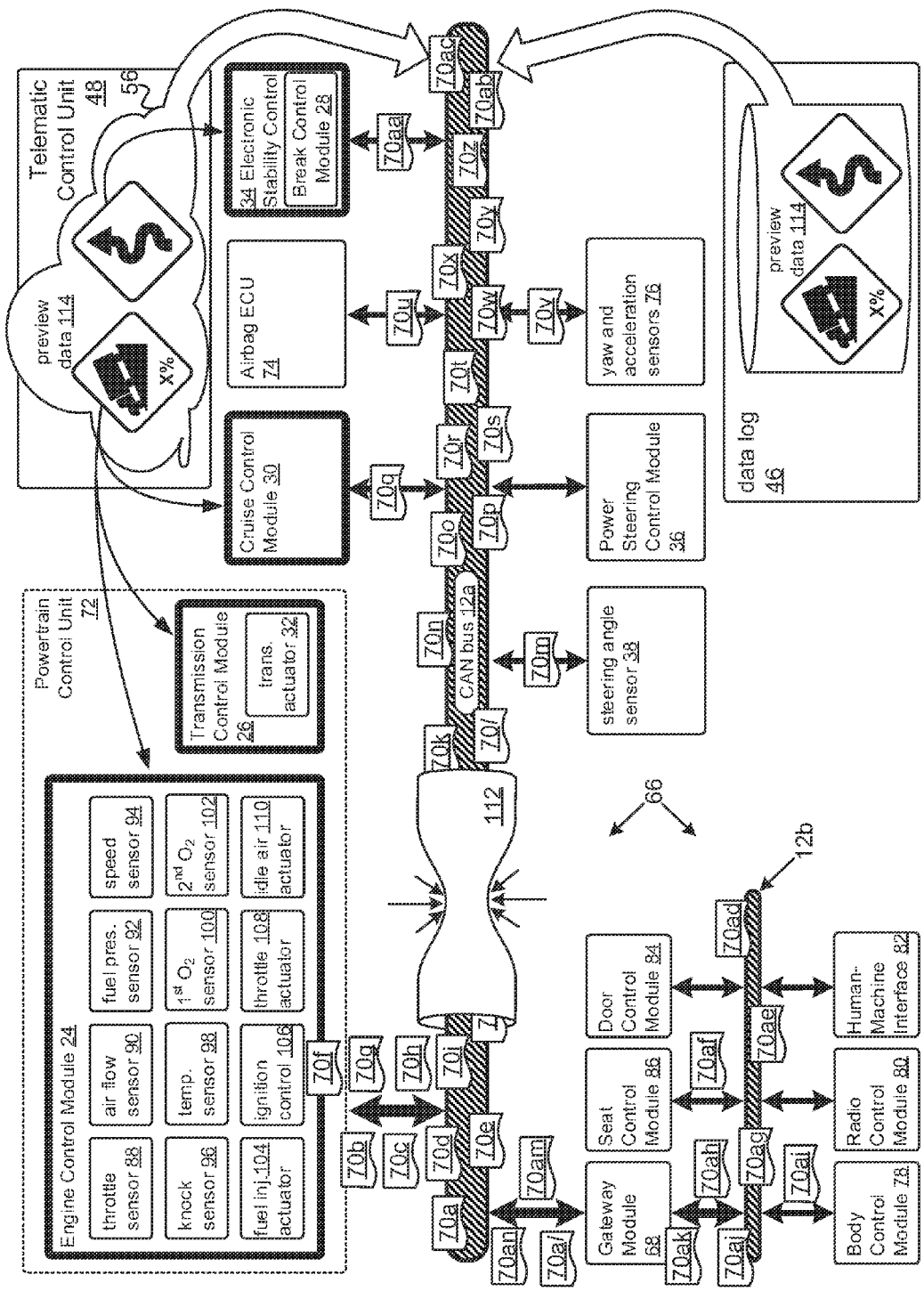
FIG. 2 is a schematic block diagram depicting issues related to the introduction of data previewing values of example road attributes that may be beneficially applied by selected electrical control systems, in accordance with examples.

Referring to FIG. 2, a schematic of a data-communication system 66 in a vehicle 10 is depicted. The data-communication system 66 may include one or more vehicle buses 12*a*, 12*b*, such as a primary vehicle bus 12*a* and a secondary vehicle bus 12*b*, or any number of different vehicle buses 12 in many different combinations of different vehicle-bus protocols. In some examples, both the primary vehicle bus 12*a* and the secondary vehicle bus 12*b* may use the same protocol, such as a CAN bus. In other examples, the primary vehicle bus 12*a* and a secondary vehicle bus 12*b* may different protocols. By way of one non-limiting example, the primary vehicle bus 12*a* may be a CAN bus and the secondary vehicle bus 12*b* may be a LIN bus.

A Gateway Module 68 may be connected to both the primary vehicle bus 12*a* and the secondary vehicle bus 12*b*. The Gateway Module 68 may pass data between the vehicle buses 12a, 12b. Passing data between the vehicle buses 12a, 12b may include one or more additional services, such as queuing data, buffering data, contextualizing data, filtering data, providing conversion services between protocols, and/or the like.

One or more vehicle buses 12 in the data-communication system 66 may implement a message-, packet-, frame-, or the like- based protocol, pursuant to which data is carried in messages/packets/frames 70a-70an. In addition to their payloads, such messages/packets/frames 70a-70an may include overhead. As discussed with respect to the previous figure, a wide variety of ECUs, sensors, actuators, interfaces, and/or other devices may transmit and/or receive messages/packets/frames 70a-z over the data-communication system 66. With respect to the primary vehicle bus 12a, non-limiting examples of such elements may include a PCU 72, a CCM 30, an airbag ECU 74, an ESC 34, a combined unit with yaw and acceleration sensors 76, a PSCM 36, and a steering angle sensor 38. To emphasize the wide range of potential ECUs, sensors, actuators, interfaces, and/or devices, the ECM 24 and TCM 26 are included in the PCU 72. Additionally, the transmission actuator 32 is included within the TCM 26, and the BCM 28 is included in the ESC 34. Additionally, the airbag ECU 74 provides an additional example of another ECU not previously discussed. Also, the yaw sensor 40 and the lateral acceleration sensor 42 of the previous figure have been combined in a common sensor unit 76. Any number of different types of elements and/or combinations in communication with the data-communication system 66 are possible.

Although several ECUs, including a Body Control Module (BCM) 78, Radio Control Module (RCM) 80, Human Machine Interface (HMI) 82, Door Control Module (DCM) 80, and Seat Control Module (SCM) 86, are not directly connected to the primary vehicle bus 12a, the data messages/packets/frames 70ad-70an that they provision to the second vehicle bus 12b are shared, at least in part, via the gateway module 68, with the primary vehicle bus 12a, just as the 70a-70ac messages/packets/frames of the primary vehicle bus 12a may be shared with the secondary vehicle bus 12b via the gateway module 68. Although some of the sensors, actuators, and/or other devices may be directly coupled to an ECU as opposed to a vehicle bus 12, the data produced by and/or required by these sensors, actuators, and/or other devices is still delivered to and/or retrieved from the vehicle buses 12a, 12b by the ECU to which they pertain.

The ECM 24 in the PCU 72 is illustrative. By way of example, and not limitation, the ECM 24 may include a throttle sensor 88, an air flow sensor 90, a fuel pressure sensor 92, a speed sensor 94, a knock sensor 96, a temperature sensor 98, a first oxygen sensor 100, a second oxygen sensor 102, a fuel injection actuator 104, an ignition control 106, a throttle actuator 108, and/or an idle air actuator 110, among other possible elements. As can be appreciated, the number of elements providing and/or requiring messages/packets/frames 70a-70an can place a large load on the data-communication system 66.

When a vehicle bus 12 is operating at capacity, the vehicle bus 12 can be a bottleneck 112 for electrical control systems in the vehicle 10. Certain messages 70 may be given priority over other messages 70. For example, messages 70 from the airbag ECU 74 and the BCM 28 may be given priority in such situations, resulting in delays that can compromise or obviate the utility of messages 70 pertaining to other electrical systems. Although only forty messages 70 are depicted in FIG. 2, during vehicle operation, a vehicle bus 12 can typically carry thousands of messages 70 at any given time, meaning that primary vehicle buses 12a can often run at or near their capacity, set, for example, in a range from 500 Kbps to 1 Mbps.

Also depicted are the onboard-collection module 46 and TCU 48, which have access to the path-preview data 114. The path-preview data 114 may provide future values for road attributes, such as, by way of example and not limitation, road gradient and road curvature, as indicated by the gradient and curvature symbols in FIG. 2. Additional non-limiting examples may include bank angle, altitude, and/or speed profile, among others. To be beneficially applied by electrical control systems within the vehicle 10, the path-preview data 114, may be provided, as discussed above, in messages/packets/frames 70 over a vehicle bus 12 to ECUs such as, without limitation, the ECM 24, TCM 26, CCM 30, and/or ESC 34.

However, the constraints imposed by the vehicle bus 12, as discussed, present considerations to be addressed by implementations that would leverage the information in the path-preview data 114 to make improvements to vehicle operations through one or more electrical control systems. As discussed below, the path-preview data 114 may be large, and/or entail periodic updates, requiring many messages 70 to be carried by an already taxed vehicle bus 12. To overcome these obstacles, characteristics of the path-preview data 114 may be uncovered and leveraged in designing an approach to compress the path-preview data 114 for delivery over a vehicle bus 12, as further discussed with respect to the following figure.

Figure 3:
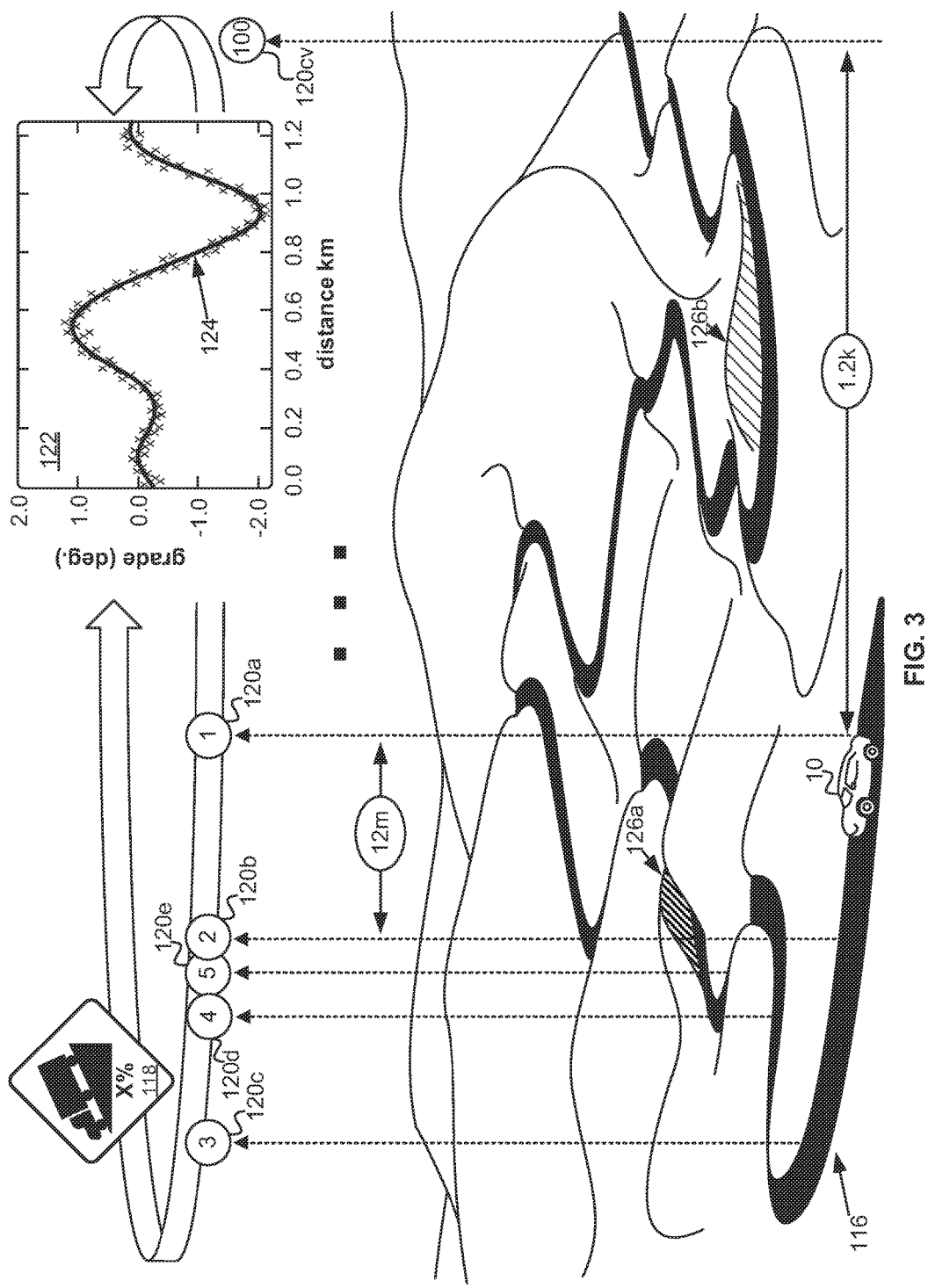
FIG. 3 depicts a span of road to be traveled by a road vehicle together with a plot of data expressing future values for the exemplary road attribute of the road gradient as indexed to distances between the vehicle and locations along the road at which the future values are measured, the plot overlaid with a function approximating that data, the depiction being illustrative of inherent limitations on both the rate of change in road attribute values and the possible amplitudes of those values built into the underlying road from which the values are measured, in accordance with examples.

Referring to FIG. 3, a 1.2 kilometer length of road 116 is depicted stretching in front of a traveling road vehicle 10. The road 116 skirts along hilly, or mountainous, terrain, giving the road fluctuating values for a particular road attribute, namely, gradient 118, as indicated by the symbol for gradient. The hilly, or mountainous, terrain also results in fluctuating values for the particular road attribute or curvature and, possibly, bank angle. However, for the sake of simplicity, FIG. 3 focuses solely on the road attribute of gradient 118.

Measurements, or data points, 120a-120cv of future values of gradient 118 to be encountered by the car 10 as it travels along the road may be taken and indexed by a metric for progression of a vehicle along the road 116. By way of example and not limitations, exemplary metrics may include discrete points in time or space. For example, and without limitation, an indexing metric may include discrete points defined in terms of distances relative to the vehicle 10 and/or relative to other discrete points, which may be evenly spaced and/or unevenly spaced. By way of another non-limiting example, an indexing metric may include discrete points in time, such as a time relative to the traveling vehicle 10 after which the vehicle 10 will encounter a particular value 120 for the gradient 118 if it proceeds at a given speed.

For the non-limiting example depicted in FIG. 3, the span of road 116 has been divided up into one-hundred measurements, or data points, 120a-120cv that are indexed to equally spaced distances relative both to the vehicle 10 and each other of twelve meters. In FIG. 3, a few of these measurements/data points 120 are denoted by the circled numbers, indicative of index number, pointed to by the dotted arrows arising from locations along the road 116 to which they pertain. Any number of different approaches to indexing measurements/data points 120 to future progression of a vehicle along a road 116 are possible.

The path-preview data 114 with the measurements/data points 120a-120cv for the road attribute of gradient 118 can be used, among other potential uses, by longitudinal control systems to provide multiple beneficial services. By way of providing non-limiting examples, such data 114 could be used, to optimize fuel consumption and/or improve ride smoothness. For example, and without limitation, such data could be used by the TCM 26 and transmission actuator 32 for predictive shift for an automatic transmission 16. As another non-limiting example, such data 114 could be used by a CCM 30 for reducing torque variation. Similarly, preview data 114 that includes information about the road curvature depicted in FIG. 3 could be used to beneficial effect by lateral control systems.

A scatter plot 122 is also depicted in FIG. 3. In the plot 122, the future values of the one-hundred measurements/data points 120a-120cv are plotted, each represented by an 'X,' with respect to distances, relative to the vehicle 10, to which they are indexed. Furthermore, the plot 122 is overlaid with a bold line 124 approximating the measurements/data points 120a-120cv as plotted relative distance. This bold line 124 can be described by a function, such as, without limitation, an approximation function and/or a regression function. For such a function 124, the distances relative to the vehicle 10, or some other metric of the vehicle's 10 progression, can be viewed as pertaining to an independent variable and the future values for the measurements 120a-120cv as pertaining to a dependent variable.

A couple of points can now be made about the characteristics of data 114 reporting on future values of different road attributes. First, with respect to the road attribute of gradient 118, the road 116 depicted in FIG. 3 exemplifies principles of road design that are applicable to several other road attributes. Although the road 116 traverses terrain that undulates a great deal from one point to another, the design of the road goes to pains to minimize changes in gradient 118. Instead of traversing from one point to another in a straight line, the road 116 describes a circuitous path to remain within a relatively small range of gradient values by skirting the shoulder of hills, despite the length added to the journey and the reduced speeds imposed by the winding road 116. Furthermore, cuts 126a, 126b are also made through the surrounding hills to avoid rapid changes in gradient.

A variety of design considerations for the road 116, such as the gradeability of a wide range of vehicles that may use the road 116, wear and tear on vehicles, particularly to breaking systems, a value placed on a smooth ride, among others, impose a limitation on the path-preview data 114, which can be referred to as the data 114 being rate limited. Rate limited data can be understood in terms of the future values having a limitation on a rate of change for the measurements/data points 120a-120cv relative to the distance to be traveled, or some other metric of the progression. Another way of expressing this is that a rate of measurements/data points 120 relative to vehicle progression can be limited, or more spread out, while still capturing relevant changes to the value of an underlying road attribute. Other examples of road attributes are also subject to a constraint on rate of change, such as, by way of non-limiting example, road curvature, which is limited by design considerations that motivate avoidance of hairpin turns. Other considerations also make other road attributes, such as, without limitation, bank angle, rate limited.

One characteristic that may be called upon in compressing path-preview data 114 is that such preview data 114 will often be rate limited. The constraint on rate of change manifests itself in the bold-line overlay 124 of the data 114 in the plot 122. As can be appreciated, rate limited data results in a smoother function than a function approximating data with larger rates of change. Additionally, any function used to approximate such data, as indexed to a metric of the vehicle's progress, will exemplify a significant degree of smoothness. The degree of smoothness and/or limited rate of change for the preview data 114 may be ascertainable from principles of road design relevant to the road attribute.

A second characteristic that may often be attributed to path-preview data 114 with respect to various road attributes, whether together with the characteristic of being rate limited or by itself, is that such data 114 is often amplitude limited. Amplitude limitation provides a boundary for values that can be expressed by the measurements/data points 120. For example, with respect to gradient 118, the gradient must be less than straight up or straight down. Furthermore, practical considerations, such as safety, vehicle gradeability, and/or vehicle wear and tear, i.e., constraints behind principles of road design, further limit the range of possible amplitudes. For example, candidates for the steepest residential street in the world have gradients of about 35%, or when expressed as degrees, 19°. Therefore, amplitudes for gradient 118 may be limited between values of 20 and −20. However, more practically, these amplitudes may be further limited. For example, gradient measurements 120a-120cv vary between 1.4° and −2.2° in FIG. 3.

Other similar limited ranges of possible amplitudes for the data 114 may be imposed by a road requirement for other road attributes. Ways in which rate limited and/or amplitude limited data may be leveraged to compress preview data are discussed further below. A brief overview of some of such innovations, leaving out certain aspects and various details for further discussion below, is set forth here.

For example, a system for communicating data to a vehicle control system over a vehicle bus 12 may include the vehicle bus 12, a server, or server-side module, and a client, or client-side module. The vehicle bus 12 may be provided within a vehicle 10 and may be operable to provide message-based communication to a set of control systems for the vehicle 10. In some examples, the vehicle bus 12 may be CAN bus 12. The server-side module and/or the client side module may be embedded with and/or added to the elements within a vehicle's electronic control systems.

The server may be operable to acquire path-preview data 114 indexed to values of for vehicle progress. The regression algorithm may fit a function 124, such as, without limitation, an approximation function, regression function, linear function, and/or the like 124, to the data 114 by assigning values to a set of coefficients that fit the function 124 to the data 114. The function may be made up of the set of coefficients corresponding to a set of sub-functions, basis functions, kernels, and/or the like. The data 114 may provide impending values for a particular road attribute with respect to a path, or road 116, along which the vehicle 10 is traveling.

In this manner, the server may generate a set of coefficients. Individual coefficients in the set of coefficients may be assigned to sub-functions combined in an approximation function 124 characterizing variation in the path-preview data 114 relative to the indexed values. By way of example and not limitation, in some examples, a regression module communicatively coupled to the server-side module may be operable to apply a Minimum-Least-Squares (MLS) algorithm to the path-preview data 114 and approximations derived from the set of coefficients and the sub-functions.

The server-side module may transmit the coefficients by messaging on the vehicle bus 12, such as, by way of non-limiting example, within a CAN message on the CAN bus 12, to the client, or client-side module. The client, which may include a processor and memory, may also be communicatively coupled to the vehicle bus 12 and may be operable to receive the messaging from the vehicle bus 12. The client may also extract the set of coefficients from the messaging, such as from a CAN message, and store a copy of the set of sub-functions/basis functions/kernels.

The client may evaluate the approximation/regression/linear function and/or the like at the client-side module by applying the set of coefficients to a copy of the sub-functions maintained at the client-side module. For example, the client may evaluate the set of coefficients as applied to the set of basis functions at anticipated points with respect to the road 116. The client system may then utilize and/or provide an evaluation of the approximation function to direct a control system.

In some examples, the future values in the path-preview data 114 may, as discussed, have a limitation on a rate of change relative to the indexed values. The limitation may be determined by a design consideration for the road 116. Furthermore, the limitation may allow an approximation function 124 to approximate the path-preview data 114 with a smoother function 124 than a function approximating data with larger rates of change.

A fitting module, communicatively coupled directly to the server, may be operable to determine values for a number of coefficients used in the approximation function 124. In such examples, the server-side module may be further operable to limit a number of coefficients in the set of coefficients to a number sufficient to approximate the path-preview data 124. The limit on the number of coefficients may be consistent with the limitation on the rate of change and the resultant degree of smoothness this limitation imposes on a function 124 approximating, or fitting, the data 114 so limited, within a use-specific range of precision. In other words, the number of coefficients may be limited to be proportionate to smoothing of the linear function 124 imposed by a constraint on rate of change in the data 114 imposed by road standards for the road attribute.

The amplitude limitation that may be imposed on preview data 114 may provide another means for compressing preview data 114 for transmission over a vehicle bus 10. As discussed above, the path-preview data 114 may report future values for a road attribute of a road 116 traveled by the vehicle 10 that have an amplitude limitation providing a boundary for values that can be expressed by the future values. Consequently, the future values may reside within a range of possible values.

In such examples, an encoding module may be operable to encode the future values in a number of bits. The encoding module may be further operable to limit the number of bits to a number sufficient to provide coefficients with enough gradation to generate an approximation function 124 capable of future values at extremes of the range of possible values while satisfying a use-specific resolution. For example, an encoder module, communicatively coupled directly to the server, may be operable to limit one or more numbers of bits used to encode at least one coefficient in the set of coefficients for inclusion in a CAN message. The one or more numbers may be proportionate to a resolution suited to the control system for the limited range of possible amplitudes for the data 114 imposed by a road requirement relative to the road attribute.

As stated, both the server and the client may have access to a copy of the sub-functions, basis functions, kernels, and/or the like 124. In some examples, the fitting module may be further operable to determine values for the set of coefficients as applied to a set of Gaussian functions serving as the set of basis functions 124. These Gaussian functions may result in a function 124 being well suited to a constraint on rate of change and a limited range of possible amplitudes for the data. In such examples, the client-side module may reproduce the approximation function 124 at the client-side module by multiplying copies of the individual Gaussian functions by individual coefficients from the set of coefficients.

Figure 4:
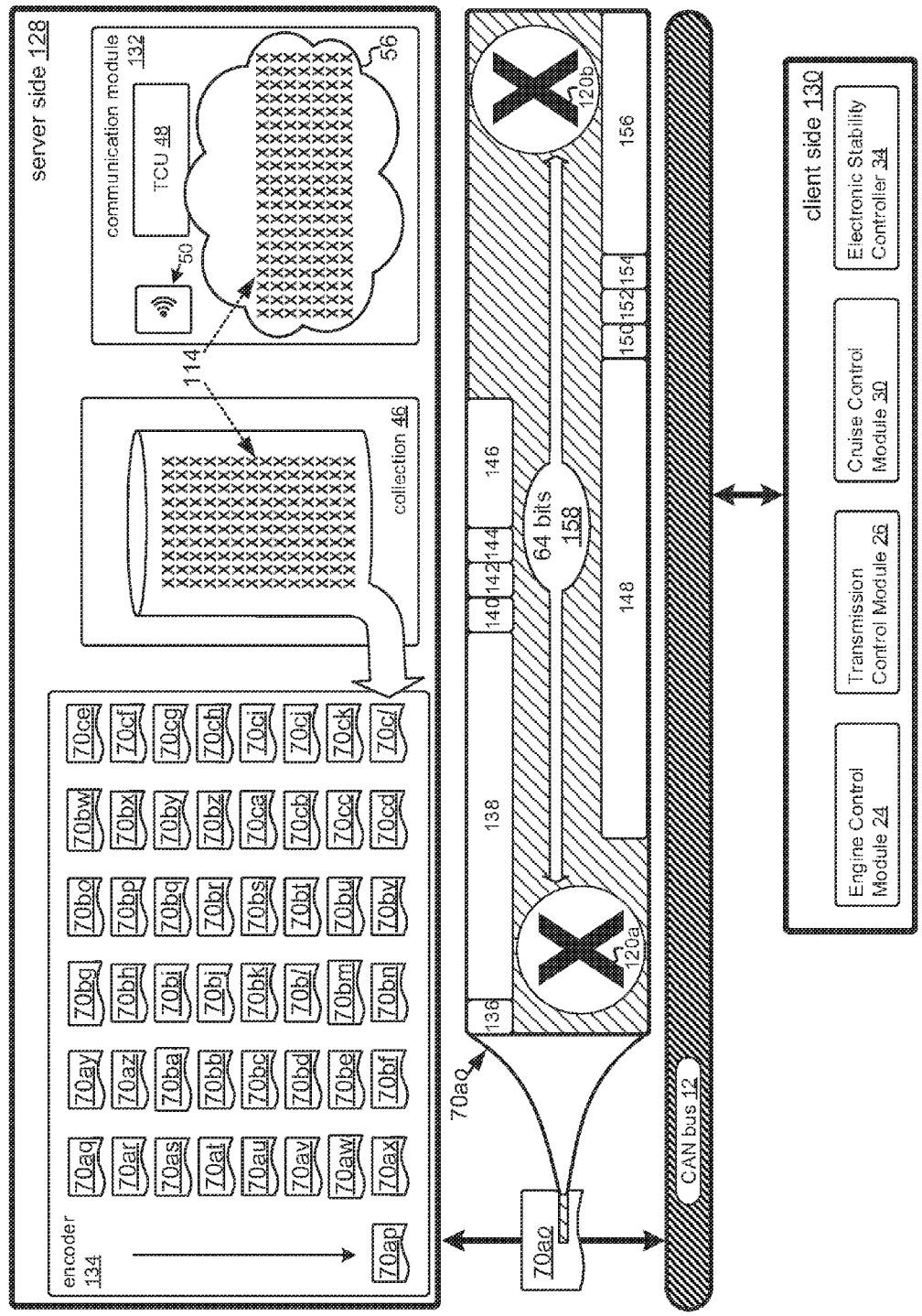
FIG. 4 is a schematic block diagram of portions of an electronic control system divided into a server side directly coupled to the preview data and connected to a client side via a vehicle bus, the client side being directly coupled to one or more electronic systems capable of beneficially applying the preview data, together with a non-limiting example of a message capable of carrying preview data on a vehicle bus, indicative of compression considerations.

Referring to FIG. 4, a server side 128, which may be a server, or server side module, and a client side 130, which may be a client, or client-side module, are depicted in relation to a vehicle bus 12. As stated above, the server side 128 may be embedded in, added to, and/or encompass a portion of the electrical control systems of the vehicle 10. The server side 128 may include and/or be directly coupled with an onboard-collection module 46 and/or a communication module 132. In some examples, therefore, the server side 128 may be operable to access the path-preview data 114 directly from the onboard-collection module 46, not over the vehicle bus 12.

In certain examples, a communication module 132, which may, without limitation, include the TCU 48 and/or the external interface 50, may be coupled directly to the server 128. In such examples, the server 128 may acquire the path-preview data 114, or at least a portion thereof, directly from the communication module 132. The communication module 132 may be operable to receive the data 114 from a cloud computing environment 56, an internet connection, and/or a mobile device 58, such as, without limitation, from a mapping application.

The server side 128 may include an encoder 134 operable to format messages/packets/frames 70ao-70cl to carry preview data 114 on the vehicle bus 12. A common amount of bits used to encode a number is 32, consistent with 32 bit architectures common among microcontrollers used in connection with vehicle buses 12. Using 32 bits to encode all one-hundred messages/data points 120a-120cv from the example in FIG. 3, however, requires the transmission of at least 3,200 bits over the vehicle bus 12 to communicate preview data 114 for a single road attribute among many potential road attributes. In some examples, more than one-hundred measurements/data points 120 may need to be communicated.

In addition to the encoded data, messaging overhead provides a further consideration. Messages 70 defined for other vehicle-bus protocols are contemplated. A CAN-message 70 is defined to include at least: a start-of-frame bit 136; eleven identifier bits 138; a remote-transmission-request bit 140; an identifier extension bit 142; a reserved bit 144; four data-length-code bits 146; fifteen cyclic-redundancy-check bits 148; a cyclic-redundancy-check-delimiter bit 150; an acknowledgement-slot bit 152; an acknowledgement-delimiter bit 154; and seven end-of-frame bits 156, for an additional fifty-one bits of overhead for each message 70. CAN-bus messages 70 can also come in an extended format that involves seventy-one bits of overhead for each message 70.

Each CAN-bus message 70, whether normal format or extended format, provides 64 bits of payload 158. A single CAN-bus message 70, therefore, can encode two measurements/data points 120a, 120b at 32 bits each. Encoding one-hundred measurements/data points 120a-120cv, therefore, involves fifty messages 70ao-70ce, meaning that 5.75 to 6.75 kilobytes, depending on format, would be added to the vehicle bus 12 to communicate a single unit of preview data 114 for a single road attribute. Furthermore, dividing that data between fifty messages 70ao-70ce, results in fifty opportunities to delay communication of the preview data 114, exponentially increasing the likelihood that delay will mitigate or obviate the utility of the preview data 114.

Once the preview data 114 has been communicated over the vehicle bus 12, it can be used at the client side 130. As with the server side 128, the client server 130 may be embedded in, added to, and/or encompass a portion of the electrical control systems of the vehicle 10. Consequently, the client server 130 may be directly coupled to electronic control system elements capable of beneficially applying the preview data 114, such as, without limitation, an ECM 24, a TCM 26, a CCM 30, and/or an ESC 34. Direct coupling between a server side 128 and preview data 114 on the one hand and a client side 130 and one or more electronic systems capable of beneficially applying the preview data 114 on the other hand may be used to compress the preview data 114 for transmission over the vehicle bus 12, as further explored with respect to the following figure.

Figure 5:
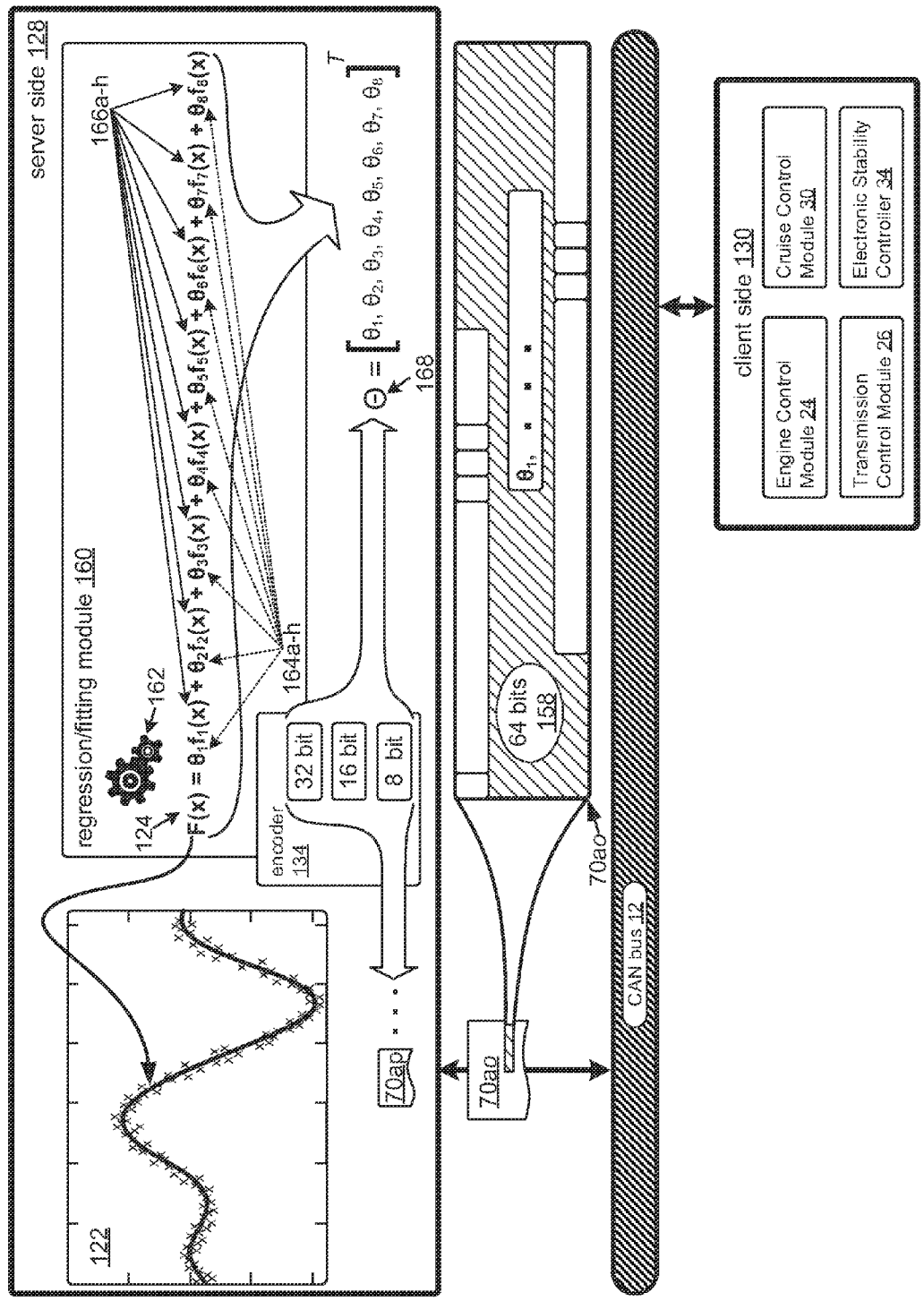
FIG. 5 depicts the approximation function demonstrating a characteristic of smoothness, arising from the limitation on a rate of change for road attribute values, together with a schematic block diagram of server-side infrastructure within a vehicle that compresses preview data by transferring the limited number of coefficients allowed by the smooth approximation function, reducing a number of messages required to convey the preview information over the vehicle bus to the client side where it can be used by an ECU, in accordance with examples.

Referring to FIG. 5, a regression/fitting module 160 is depicted. The regression/fitting module 160 may be within the server side 128 and/or communicatively coupled to the server side 128. The regression/fitting module 160 may be operable to apply an algorithm for data fitting and/or regression analysis 162 to fit an approximation/regression function 124 to the preview data 114, as depicted by the plot 122 in the upper-left-hand corner. In some examples, the regression/fitting module 160 may fit the function 124 to the data 114 by changing values for multiple coefficients 164a-h. In such examples, individual coefficients 164a-h are combined to sub-functions/basis functions/kernels and/or the like 166a-h. Once the approximation/regression function 124 is fit to the preview data 114, values for the coefficients 164a-h may be included in a set of coefficients 168. In some examples, the function 124 may be linear in the coefficients 164. In other examples, the coefficients 164 may be substituted with constants applied in any number of different mathematical operations and/or capacities.

As can be appreciated, much of the structure and functionalities discussed with respect to elements disclosed herein, may be provided by modules. Modules may take the form of an entirely hardware embodiment, an entirely software embodiment (including firmware, resident software, micro-code, etc.), or an embodiment combining software and hardware aspects. Furthermore, aspects of the presently discussed subject matter may take the form of a computer program product embodied in any tangible medium of expression having computer-usable program code.

With respect to software aspects, any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that may contain, store, communicate, propagate, or transport the program for use by or in connection with the instruction execution system, apparatus, or device.

Computer program code for carrying out operations of the present invention may be written in any combination of one or more programming languages, including an object-oriented programming language such as C++, and conventional procedural programming languages, such as the "C" programming language, or similar programming languages. Aspects of a module that are implemented with software may be executed on a micro-processor, Central Processing Unit (CPU) and/or the like. Any hardware aspects of the module may be implemented to interact with software aspects.

Returning to the functionality of the regression/fitting module 160, any number of different types of functions may be used for the sub-functions/basis functions/kernels 166. In some examples, all of the functions may be of the same type. In other examples, different types of sub-functions/basis functions/kernels 166 may be combined. By way of non-limiting examples, such sub-functions/basis functions/kernels 166 may include polynomials, sine functions, cosine functions, functions involved in a Fourier series, and/or any number of different types of elementary functions, together with additional possibilities, some of which being discussed further below.

Because the preview data 114 may be rate limited for several types of road attributes, as discussed with respect to FIG. 3, a certain level and/or degree of smoothness can be attributed to the approximation function 124, such that a limited number of coefficients 164 and sub-functions/basis functions/kernels 166 may be used to fit a regression function 124 to the data 114 with a sufficient degree of precision to describe the preview data 114 for one or more uses by one or more control systems. If the underlying data could not be constrained as being rate limited, such as would be the case, for example, with white noise, or some other data set that would require a more jagged approximation function, the number of coefficients 164 could not be so limited, or would be much greater.

As can be appreciated, the number of coefficients 164, eight in the example depicted in FIG. 5, is much less than the number of measurements/data points 120, one-hundred in the current example. In this example, the number of coefficients 164 is more than an order of magnitude less than the number of measurements/data points 120. Rate limited preview data 114 for road attributes, may, as a general rule, require many fewer coefficients 164 to create a sufficiently precise approximation function 124 than the number of measurements/data points 120 being approximated.

By providing the client side 130 with a copy of the sub-functions/basis functions/kernels 166 that can be maintained, or stored, at the client side 130, the server side 128 may communicate the information in the preview data 114 without having to transmit the preview data. The server side 128, may simply transmit the coefficients 168 to the client side 130. At the client side 130, the client 130 may extract the information by evaluating the coefficients 168 with the copy of the sub-functions/basis functions/kernels 166 maintained thereat. In this way the server side 128 may compress the data 114 for transmission on the vehicle bus 12.

Although eight coefficients 164a-h may correspond to eight sub-functions/basis functions/kernels and/or the like 166a-h, any number of coefficients 164 and/or sub-functions/basis functions/kernels 166 are possible. Indeed, where a limit of rate may be ascertainable from principles of road design, road standards, and/or such considerations, a limit to the number of coefficients 124 for a given set of functions/basis functions/kernels 166 may be determined and imposed and/or enforced by the server 128, the regression/fitting module 160, the encoder module 134, and/or the like.

Once values have been determined for the set of coefficients 168, the server 128, an encoder module 134, and/or the like may format one or more messages 70, encode coefficients 164, and/or include the coefficients 164 in one or more message payloads 158. The resultant message(s) 70 may then be carried on the vehicle bus 12 to the client 130.

As indicated in the encoder 134, different numbers of bits may be used to encode coefficients 124. The number of messages 70 required may be determined by the number of coefficients 164 and/or the number of bits used to encode coefficients 164, which may be common to all the coefficients 164 and/or vary from coefficient 164 to coefficient 164. The characteristic of amplitude limitation exhibited by data 114 about many different types of road attributes, as discussed with respect to FIG. 3, can be used as an additional, or alternative, approach to compressing the preview data 114, as discussed further with respect to the following figure.

Figure 6:
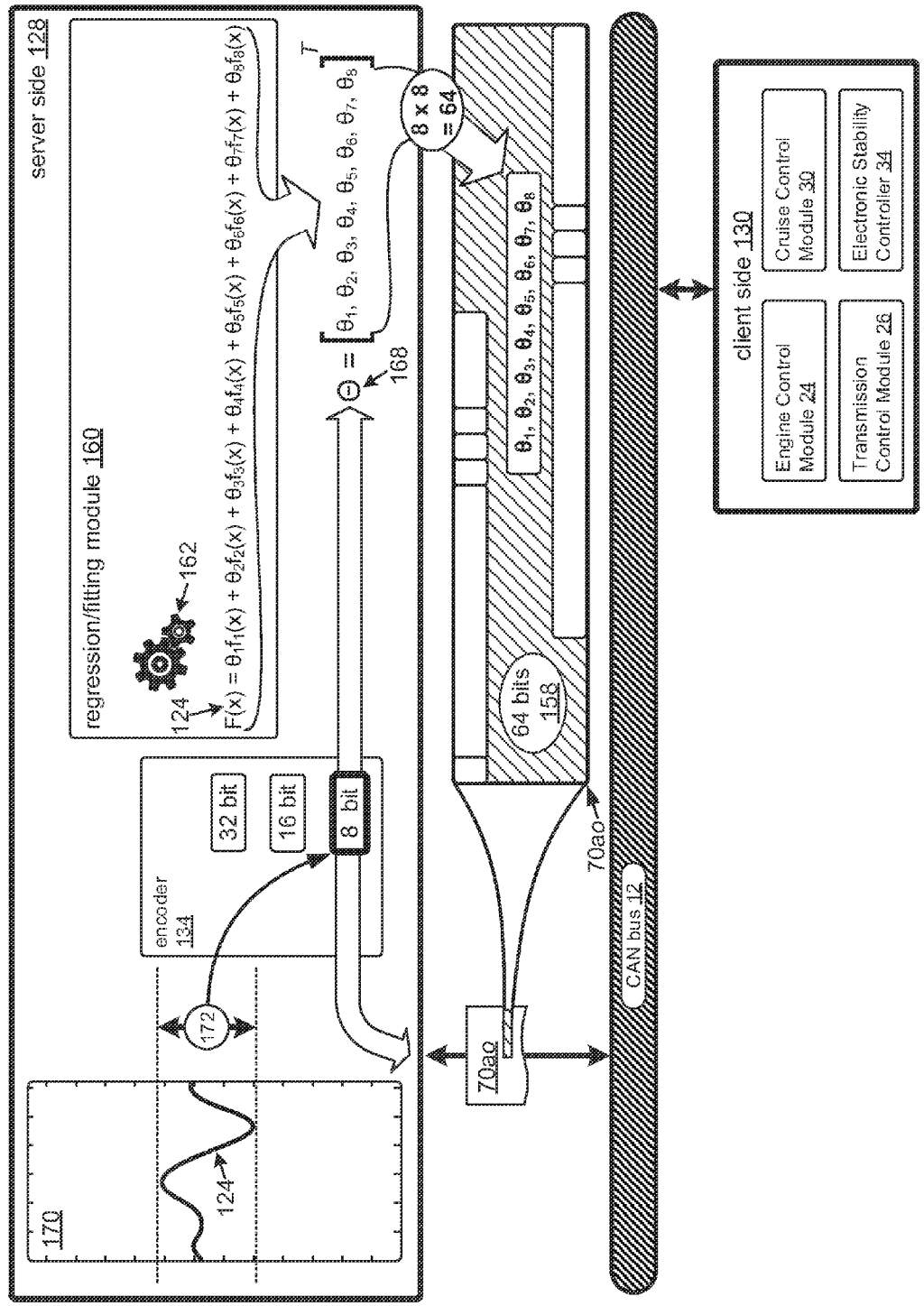
FIG. 6 depicts the approximation function demonstrating a characteristic of a limitation of potential amplitude values, together with a schematic block diagram of a server-side infrastructure within a vehicle that compresses the preview information with a limited number of bits required to provide sufficient resolution for the limited range of amplitudes, reducing a number of messages required to convey the preview information over the vehicle bus to the client side where it can be used by an ECU, in accordance with examples.

Referring to FIG. 6, an approximation/regression function 124 is depicted on a graph 170 indicative of a relatively limited range 172 of potential amplitude values that can be expressed by the preview data 114. Such limitations on amplitude values 172 are common for a wide variety of road attributes, as discussed with respect to FIG. 3. Indeed, limitations on amplitude values 172 can be derived for various road attributes from principles of road design, practical considerations, road standards, and/or the like.

Where limits on amplitude values 172 can be established, a number of bits required to establish a required resolution or level of gradation for a specific use may be established to encode measurements/data points 120. Where the limitation on amplitudes 172 restricts values to a narrow range, as in FIG. 6, the number of bits required to encode data measurements/data points 120, for a given resolution, may be reduced relative to a number of bits to encode data measurements/data points 120 for a large range of potential values. Therefore, in some examples, determining limitations on amplitudes 172 can be used to limit a number of bits required to encode data measurements/data points 120, allowing the preview data 114 to be compressed for transmission.

These principles can be extended to examples where a first method of data compression is applied in terms of sending coefficients 164 as opposed to measurements/data points 120. The amount of gradation, or resolution within the coefficients 164, while not being directly equal to the resolution between values at extremes of the range of possible values for amplitude, is, nonetheless correlated to this resolution. Hence, once a limitation on amplitude values 172 is determined, a limitation on a number of bits used to encode a coefficient 164 may be imposed. Such a limitation may be set to provide coefficients 164 with enough gradation to generate an approximation function 124 capable of future values at extremes of the range of possible values while satisfying a use-specific resolution.

In the example depicted in FIG. 6, the relatively narrow amplitude limitation 172 may be used to determine that eight bits are sufficient to encode the coefficients 164, compressing information for transmission by a factor of four relative to a scenario using 32 bit encoding. The encoder 134 may, therefore, limit the number of bits to encode a coefficient 164 to eight bits. Although possible numbers for encoding information are depicted in FIG. 6 as eight bits, sixteen bits, and thirty-two bits, any number of bits may be used. Also, in some examples, a common limit on a number of bits may be enforced to encode all coefficients 164. In other examples, different limits for encoding bits may be enforced for different coefficients 164.

In some examples, an encoding module 134 may be operable to limit the number of bits that can be used to encode coefficients 164 such that a product of the number of bits and the number of coefficients 164 equals an amount that can be carried within a payload 158 of a predetermined number of messages 70, such as a single message 70$ao$, defined for the vehicle bus 12. In the example depicted in FIG. 6, the number of coefficients 164 in the set of coefficients 168 is limited to eight. Additionally, as stated, the number of encoding bits is limited to eight. Hence, the product of the number of coefficient, i.e., eight, and the number of encoding bits, i.e., eight, is sixty-four, which is equal to the size of the payload 158 of a single CAN-message 70$ao$.

Hence, by leveraging both the rate limited and amplitude limited nature of preview data 114 for many different types of road attributes, a preview set of one-hundred measurements/data points 120 that would require fifty CAN-messages 70$ao$-70$cl$ to transmit to a client 130 over a CAN bus 12 can be compressed to a single CAN-message 70$ao$. Not only would such compression approaches reduce the amount of data to be transmitted, but it would greatly reduce the potential for delay in the delivery of the information by placing it in a single CAN-message 70$ao$. At this point several details related to the leveraging of characteristics of preview data 114 about road attributes have been explored, while potential details about approaches to data fitting and/or regression analysis behind reliance on the transmission of a set of coefficients 168 remain for additional exploration, with the help of the following figures.

Referring to FIG. 7$a$, an equation is defined. As discussed above, the characteristic of preview data 114 that is rate limited allows for a smaller number of coefficients 164, which are unknowns, to be determined in the process of fitting an approximation function 124 to the preview data 114, than the number of measurements/data points 120 in the preview data. The result is an overdetermined system. Since the system is overdetermined, an approach of Ordinary Least Squares (OLS), or Minimum Least Squares (MLS), may be used to approximate, or fit the regression function to the preview data 114 with a closed-form, unique solution.

As can be appreciated, any number of different regression, or fitting techniques may be applied to determine the values for the set of coefficients. The following discussion is provided simply by way of providing one non-limiting example. Hence, the equation set forth in FIG. 7$a$ provides a definition for a least squares functional, i.e., an equation behind the OLS/MLS approach that quantifies differences between the data 114 and an approximation function 124. In the equation, 'S' represents the sum of the squared residuals at 'N' different points between the values of the set of preview data 114 and the approximation function 124 for common index values, 'k.' The value of 'N' is equal to the number of data points/measurements 120.

The set of preview data 114 is represented by the '$\delta$'. The set of preview data 114 may be reevaluated periodically. The approximation function 124 is depicted as the product of the transpose of the set of coefficients '$\Theta$' 168 and a matrix of sub-functions/basis functions/kernels '$\phi$.' The residuals are the differences between the preview data 114 and the approximation function 124 at common values of 'k.' The value of 'k' differs for each of the 'N' data points/measurements 120, potentially being equal to the value for the metric of vehicle's progression to which the corresponding data points/measurements 120 is indexed. A set of weights denoted as '$\gamma$' is discussed further below. The set of coefficients '$\Theta$' 168 may be determined by minimizing the value of 'S.' However, before, discussing the determination of the set of coefficients, a constraint that may be set for the set of coefficients 168 is discussed below.

Referring to FIG. 7$b$, an inequality is defined. The inequality imposes a constraint that can be applied to the set of coefficients 168 where the underlying data 114 is subject to a limited range of potential amplitudes 172. As discussed above, where the range of values for potential amplitudes of the preview data 114 can be limited, the potential values for the coefficients 164 can also be limited. Hence, in the inequality, the set 'L' provides a set of lower boundaries corresponding to individual coefficients 164 in the set of coefficients 'Θ' 168. Conversely, the set 'U' provides a set of upper boundaries corresponding to individual coefficients 164 in the set of coefficients 'Θ' 168. Depending on the example, the elements in 'L' and/or 'U' can all have the same value or different values.

Figures 7A, 7B, 7C:
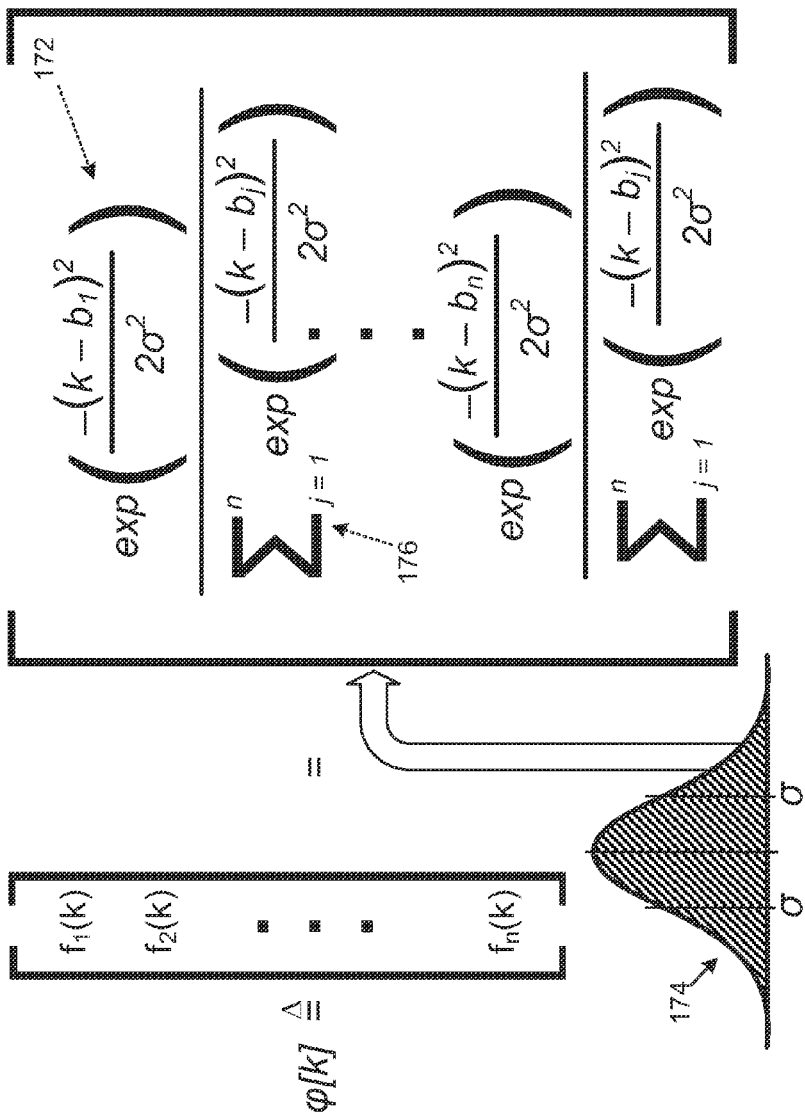
FIG. 7a is an example of an equation used to fit, approximate, and/or optimize an approximation function to the preview data, for example, by means of a Ordinary Least Squares (OLS) approach, in accordance with examples.
FIG. 7b is an inequality condition that can be imposed on the set of coefficients because of limitations imposed by considerations imposed by principles of road design; in accordance with examples.
FIG. 7c defines a n×1 matrix of Gaussian functions such as may serve as basis, or kernel, functions to generate the approximation, or regression, function, in accordance with examples.

Approaches to determining the set of coefficients 'Θ' 168 that minimize the value 'S' for the equation in FIG. 7a are widely discussed in the literature. At a conceptual level, solving for coefficients 164 amounts to taking partial derivatives with respect to those coefficients 164. The literature on this subject is readily accessible to those of reasonable skill in the art. By way of providing one non-limiting example, a method for solving the constrained least squares problem set forth in the equation and inequality of FIGS. 7a and 7b is provided in Lawson, Charles L and Hanson, Richard J, *Solving least squares problems.* Vol. 161. Englewood Cliffs, N.J.: Prentice-Hall, 1974, which is incorporated herein by reference.

Referring to FIG. 7c, an example set of linear-predictor functions, sub-functions, basis functions, kernels, and/or the like 166, 'φ,' is defined and equated to one possible, non-limiting example. The set, 'φ,' may, without limitation, make up an n×1 matrix with elements that may be the linear-predictor functions, sub-functions, basis functions, kernels, and/or the like 166 to be used in minimizing the least squares functional defined in FIG. 7a. In certain examples consistent with the n×1 matrix 'φ' defined in FIG. 7c, the linear-predictor functions, sub-functions, basis functions, kernels, and/or the like 166 may be made up of a set of Gaussian functions/kernels, 172, an example evaluation 174 of such a Gaussian function/kernel also being depicted. Gaussian functions/kernels, 172 may be particularly well suited to serve as linear-predictor functions, sub-functions, basis functions, kernels, and/or the like 166 because of the characteristic degree of smoothness exhibited by Gaussian kernels/functions 174, consistent with the smoothness imposed by the rate limited nature of the preview data 114 for many different types of road attributes. The n×1 matrix, 'φ,' may have dimensions of 'n' rows, where 'n' is equal to the number of coefficients 164 in the set of coefficients 168.

With respect to the Gaussian functions/kernels 172, the values for '$b_{1-n}$' define the kernel/function centers. By way of example and not limitation, the kernel/function centers '$b_{1-n}$' may be located at 'n' evenly spaced points with the first being located at 0.1 'N' and the '$n^{th}$' being located at 1.1 'N,' where N is equal to the number of elements in the preview data 114. Also, by way of example and not limitation, the standard of deviation, 'σ,' may be chosen as 'N'/10. In evaluating the Gaussian functions/kernels 172, the difference between 'k' and '$b_{1-n}$' may be multiplied by the distance between individual measurements/data points 120 in the preview data 114, or 12m in the example depicted in FIG. 3. Additionally, in some examples, the various Gaussian functions/kernels 172 for each 'k' may be normalized by dividing each of the Gaussian functions/kernels 172 in the row by the sum of all the Gaussian functions/kernels 176.

As stated with respect to the least squares functional in FIG. 7a, a set of weights, 'γ[k],' may be applied to an equation used to determine the set of coefficients 168 during regression analysis. Since the electronic control systems may be more sensitive to values for measurements 120 closer to the vehicle 10, by way of example and not limitation, the set of weights, 'γ[k],' may place greater emphasis on data more proximate to the vehicle 10 within a preview horizon provided by the path-preview data 114. In some examples, the fitting module 160 may be operable to weight data more proximate along the road relative to the vehicle 10 move heavily in fitting the linear function 124 to the data.

The foregoing discussion explores the use of linear-predictor functions, sub-functions, basis functions, kernels, and/or the like 166 at the server side 128 to identify a set of coefficients 168 to transmit the client side 130. The client side 130 also possesses a copy of the linear-predictor functions, sub-functions, basis functions, kernels, and/or the like 166 to evaluate previews for one or more road attributes with the coefficients 168 it receives. This process is discussed with the help of the flowchart in the following figure from the point of view of a method.

The flowchart illustrates the architecture, functionality, and/or operation of possible implementations of systems, methods, and computer program products according to examples. In this regard, each block in the flowchart may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

Where computer program instructions are involved, these instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block or blocks. These computer program instructions may also be stored in a computer readable medium that may direct a computer to function in a particular manner, such that the instructions stored in the computer-readable medium produce an article of manufacture including instruction means which implement the function/act specified in the flowchart and/or block or blocks.

It should also be noted that, in some alternative implementations, the functions noted in the blocks may occur out of the order noted. In certain embodiments, two blocks shown in succession may, in fact, be executed substantially concurrently, or the blocks may sometimes be executed in the reverse order, depending upon the functionality involved. Alternatively, certain steps or functions may be omitted.

Figure 8:
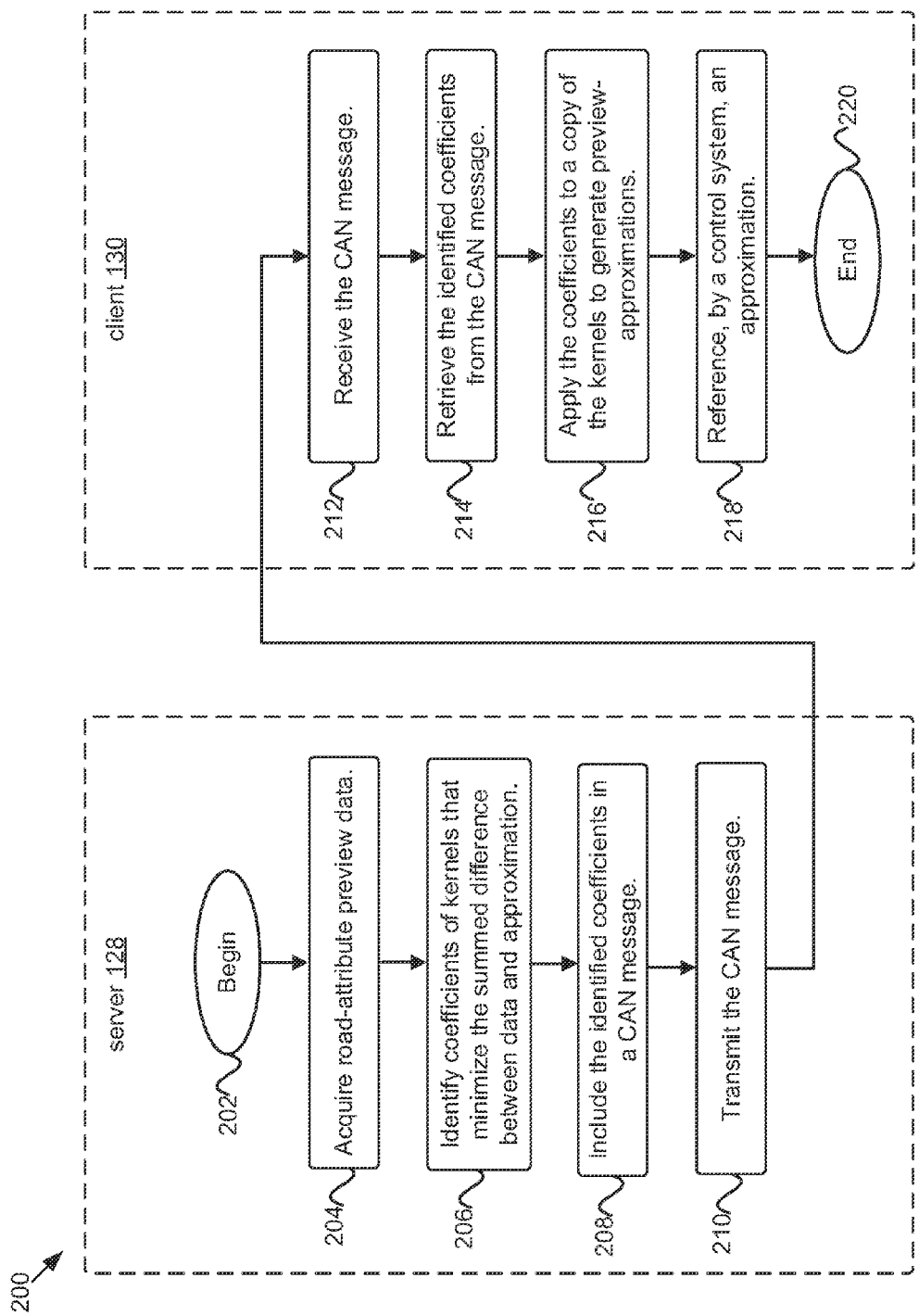
FIG. 8 is a flow chart of steps for compressing, transmitting, and evaluating preview data about future road attribute values usable by ECUs in a vehicle, in accordance with examples.

Referring to FIG. 8, a method 200 for compressing vehicle-bus data is depicted. The method may begin 202 by acquiring 204 road-attribute data 114 at a server side 128. The server 128 may generate coefficients 164 applied to kernels 166 while fitting a function 124 to data 114 of future values for a road attribute indexed to a vehicle's future progress by identifying 126 coefficients 162 applied to a set of kernels 166 in an approximation function 124 that minimize the summed difference between the preview data 114 and the approximation function 124. The server 128 may include 208 the identified coefficients 168 in a vehicle-bus message 70, such as a CAN message 70, and transmit 210 the vehicle-bus message 70, with the coefficients 168, over a vehicle bus 12 to a control system of the vehicle 10. Also, some examples may also include limiting a product of a number of coefficients and a number bits to a value accommodated by a payload 158 of a message 70 deliverable by the vehicle bus 10 and formatting the message 70 for carring encoded coefficients 164 to the control system over the vehicle bus 12.

The method 200 may continue at a client side 130, which may receive 212 the vehicle-bus message 70 and retrieve 214 the identified coefficients 168 from the vehicle-bus message 70. The client 130 may evaluate, for a control system, a future road-attribute value by applying 216 the coefficients 164 from the vehicle bus 12 to a copy of the kernels 166 to generate preview approximations. A control system may reference 218 one or more approximations at the client 130 and the method 200 may end 220.

In some examples, the method 200 may further include limiting a number of coefficients 164 in the set of coefficients 168 commensurate with a reduced number of coefficients required to fit the regression function 124 to the preview data 114 with a limited rate of change. The limited rate of change may be ascertainable from principles of road design. Additionally, or in the alternative, some examples may further include encoding the coefficients 164 in a limited number of bits commensurate to a limited range of potential amplitudes 172 for values within the preview data 114 imposed by principles of road design. In some examples, a set of Gaussian functions 172 may be used by the server 128 and the client 130 as the kernels to fit a regression function 124 suited to a limited rate of change and the limited range of potential amplitudes 172 for the preview data 114.

The present disclosures may be embodied in other specific forms without departing from their spirit or essential characteristics. The described examples are to be considered in all respects only as illustrative, not restrictive. The scope of the invention is, therefore, indicated by the appended claims, rather than by the foregoing description. All changes within the meaning and range of equivalency of the claims are to be embraced within their scope.

The invention claimed is:

1. A system for communicating data to a vehicle control system, comprising:
a vehicle bus provided within a vehicle and operable to provide message-based communication to a set of control systems for the vehicle;
a server-side module, communicatively coupled to the vehicle bus, operable to:
acquire path-preview data indexed to values of a metric for vehicle progress;
perform regression analysis on the path-preview data to generate a set of coefficients assigned to sub-functions combined in an approximation function characterizing variation in the path-preview data relative to the values indexed;
transmit the coefficients by messaging on the vehicle bus;
a client-side module, communicatively coupled to the vehicle bus, operable to:
receive the messaging from the vehicle bus;
extract the set of coefficients from the messaging;
evaluate the approximation function at the client-side module by applying the set of coefficients to a copy of the sub-functions maintained at the client-side module;
utilize an evaluation of the approximation function to direct a control system.

2. The system of claim 1, wherein:
the vehicle is a road vehicle;
the path-preview data report future values for a road attribute of a road traveled by the vehicle, the future values having a limitation on a rate of change relative to the values indexed, the limitation determined by a design consideration for the road, the limitation allowing the approximation function to approximate the path-preview data with a smoother function than a function approximating data with larger rates of change; and
the server-side module is further operable to limit a number of coefficients in the set of coefficients to a number sufficient to approximate the path-preview data, which is consistent with the limitation on the rate of change, within a use-specific range of precision.

3. The system of claim 2, further comprising an encoding module operable to encode the coefficients in a number of bits, the encoding module further operable to limit the number of bits such that a product of the number of bits and the number of coefficients is equal to an amount that can be carried within a payload of a single message defined for the vehicle bus.

4. The system of claim 2, wherein:
the vehicle is a road vehicle;
the path-preview data report future values for a road attribute of a road traveled by the vehicle, the future values having an amplitude limitation providing a boundary for values that can be expressed by the future values, such that the future values reside within a range of possible values; and
the system further comprising an encoding module operable to encode the coefficients in a number of bits, the encoding module further operable to limit the number of bits to a number sufficient to provide coefficients with enough gradation to generate the approximation function capable of future values at extremes of the range of possible values while satisfying a use-specific resolution.

5. The system of claim 4, wherein the client-side module reproduces the approximation function at the client-side module by multiplying individual Gaussian functions by individual coefficients from the set of coefficients, the sub-functions comprising a set of Gaussian functions.

6. The system of claim 4, further comprising a regression module communicatively coupled to the server-side module and operable to apply a Minimum-Least-Squares (MLS) algorithm to the path-preview data and approximations derived from the set of coefficients and the sub-functions.

7. The system of claim 4, further comprising a regression module operable to apply a set of weights to an equation used to determine the set of coefficients during regression analysis, the set of weights placing greater emphasis on data more proximate to the vehicle within a preview horizon provided by the path-preview data.

8. The system of claim 4, further comprising:
an onboard-collection module operable to collect and store the path-preview data as the vehicle travels the road on a previous journey; and wherein
the server-side module is further operable to access the path-preview data directly from the onboard-collection module, not over the vehicle bus.

9. A method compressing vehicle-bus data, comprising:
generating, at a server, coefficients applied to kernels while fitting a function to data of future values for a road attribute indexed to a vehicle's future progress;

transmitting the coefficients over a vehicle bus to a control system of the vehicle;
evaluating, at a client and for the control system, a future road-attribute value by applying the coefficients from the vehicle bus to a copy of the kernels.

10. The method of claim 9, further comprising limiting a number of coefficients commensurate with a reduced number of coefficients required to fit the function to the data with a limited rate of change ascertainable from principles of road design.

11. The method of claim 9, further comprising encoding information in a limited number of bits commensurate to a limited range of potential amplitudes for values within the data imposed by principles of road design.

12. The method of claim 9, further comprising utilizing a set of Gaussian functions as the kernels to fit the function, the Gaussian functions suited to a limited rate of change and the limited range of potential amplitudes for the data.

13. The method of claim 12 further comprising normalizing the set of Gaussian functions.

14. A method for claim 9, further comprising:
limiting a product of a number of coefficients and a number bits to a value accommodated by a payload of a message deliverable by the vehicle bus; and
formatting the message for carrying encoded coefficients to the control system over the vehicle bus.

15. A system for communicating data over a vehicle bus, comprising:
a Controller Area Network (CAN) bus within a road vehicle;
a server, communicatively coupled to the CAN bus and comprising a processor and memory, operable to:
fit a function, comprising a set of coefficients corresponding to a set of basis functions, to data by assigning values to the set of coefficients that fit the function to the data, the data providing impending values for a particular road attribute with respect to a road along which the road vehicle is traveling; and
transmit the set of coefficients within a CAN message on the CAN bus; and
a client, communicatively coupled to the CAN bus and comprising a processor and memory, operable to:
store a copy of the set of basis functions;
retrieve the set of coefficients from the CAN message on the CAN bus; and
evaluate the set of coefficients as applied to the set of basis functions at anticipated points with respect to the road.

16. The system of claim 15 further comprising a fitting module, communicatively coupled directly to the server, operable to determine values for a number of coefficients, the number of coefficients limited to be proportionate to smoothing of the function imposed by a constraint on rate of change in the data for the road attribute imposed by road standards.

17. The system of claim 16, further comprising an encoder module, communicatively coupled directly to the server, operable to limit at least one number of bits used to encode at least one coefficient in the set of coefficients for inclusion in the CAN message to a number proportionate to a resolution suited to the control system for a limited range of possible amplitudes for the data imposed by a road requirement relative to the road attribute.

18. The system of claim 17, wherein the fitting module is further operable to determine values for the set of coefficients as applied to a set of Gaussian functions serving as the set of basis functions and resulting in the function being well suited to the constraint on rate of change and the limited range of possible amplitudes for the data.

19. The system of claim 17, wherein the fitting module is further operable to weight data more proximate along the road relative to the vehicle move heavily in fitting the function to the data.

20. The system of claim 17, further comprising a communication module communicatively coupled directly to the server and operable receive the data from at least one of a cloud computing environment, an internet connection, and a mobile device.

* * * * *